Sept. 19, 1967  P. H. GRIFFIN III  3,342,215
MUD THROTTLING VALVE
Filed May 6, 1965
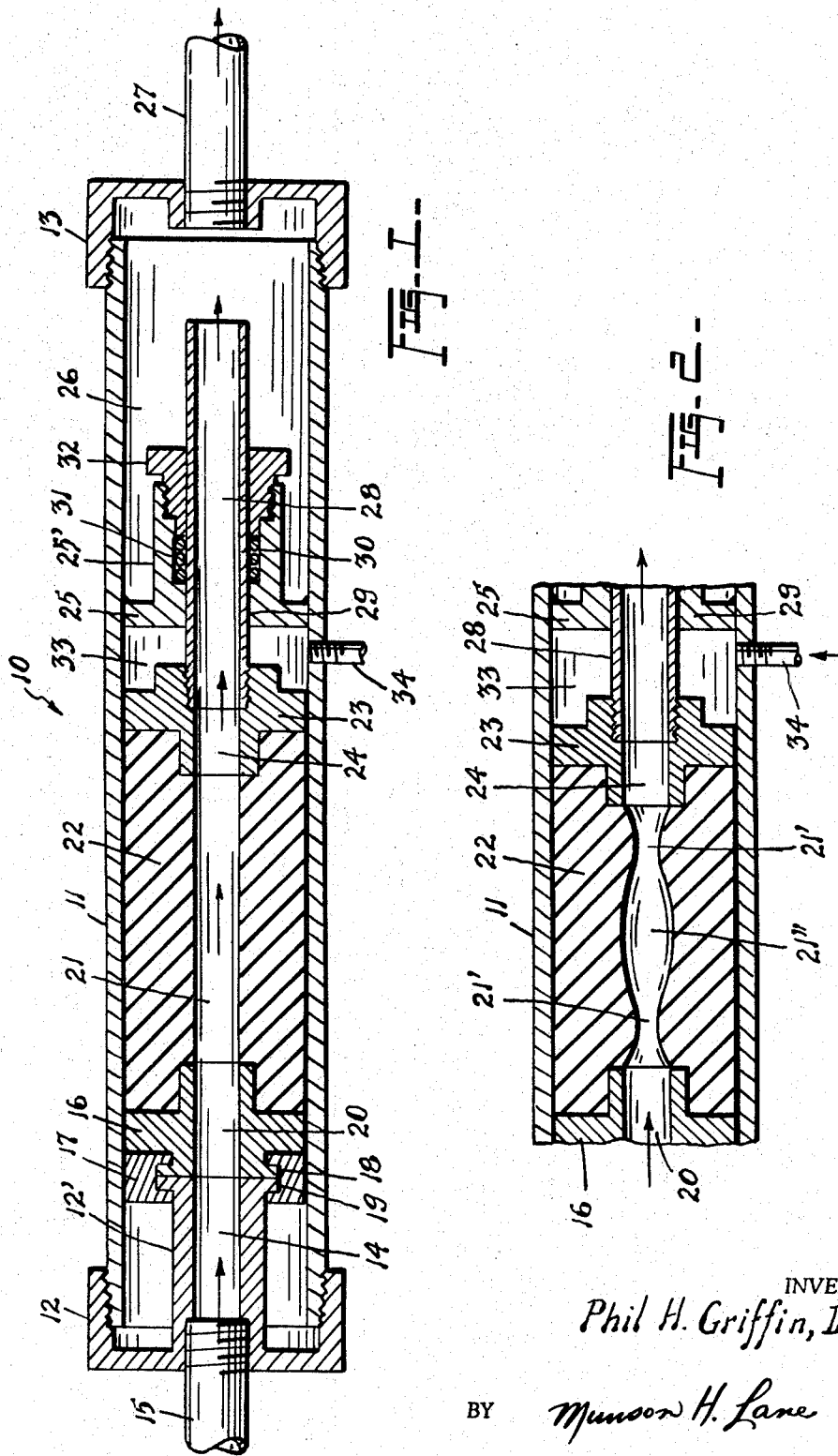
INVENTOR
Phil H. Griffin, III
BY Munson H. Lane
ATTORNEY

United States Patent Office 3,342,215
Patented Sept. 19, 1967

3,342,215
MUD THROTTLING VALVE
Phil H. Griffin III, Fort Worth, Tex., assignor to Bass
Brothers Enterprises, Inc., Fort Worth, Tex.
Filed May 6, 1965, Ser. No. 453,663
4 Claims. (Cl. 138—45)

ABSTRACT OF THE DISCLOSURE

The present application discloses a hydraulic throttling valve comprising in combination, a tubular housing having a fluid inlet end and a fluid outlet end, and abutment member fixed in the fluid inlet end portion of said housing and provided with a central port in communication with the fluid inlet, a tubular valve member of resilient material positioned in the housing with one end thereof against said abutment member, said valve member having a central fluid passage in register with said central port of said abutment member, a piston slidable in the housing and abutting the other end of said valve member, said piston having a central port in register with said fluid passage of the valve member, a partition secured in said housing in spaced relation between said piston and said outlet end of the housing, the portion of the housing between said partition and the housing outlet end defining a fluid outlet chamber discharging through the outlet end, a fluid transmitting tube secured centrally to said piston in register with the piston port, said tube extending slidably through said partion and having an outer end discharging into said fluid outlet chamber, a portion of said housing between said partition and said piston defining a pressure chamber surrounding said tube but out of communication with the interior of the latter, said resilient valve member being axially compressible by said piston and radially inwardly expansible whereby the cross-section of said passage may be reduced as a function of axial thrust applied to the valve member by the piston, and means for admitting fluid under pressure into said pressure chamber whereby to effect application of axial thrust by said piston to said valve member.

---

This invention relates to new and useful improvements in valves, and more particularly the invention concerns itself with a valve such as may be used to effectively throttle the flow of mud from an oil well and thereby create a back pressure against the well.

The principal object of the invention is to provide a simple and highly efficient throttling valve which utilizes a resilient valve member encased in a cylindrical housing and provided with an axial fluid passage, the arrangement being such that when axial thrust is applied to the valve member, it is axially compressed and radially inwardly expanded to reduce the cross-section of the fluid passage and thereby provide the desired throttling action.

Another object of the invention is to provide a throttling valve of this type wherein the application of axial thrust and resultant axial compression of the resilient valve member is effected hydraulically by pressurized fluid which is entirely separate from and independent of the fluid passing through the valve.

Other advantages of the invention reside in its simplicity of construction, efficient and dependable operation, and in its adaptability to convenient and economical manufacture.

With the foregoing more important objects and features in view and such other objects and features as may become apparent as this specification proceeds, the invention will be understood from the following description taken in conjunction with the accompanying drawings, wherein like characters of reference are used to designate like parts, and wherein:

FIGURE 1 is a longitudinal sectional view of the throttling valve of the invention in its fully open position; and FIGURE 2 is a fragmentary longitudinal sectional view, showing the valve partially closed.

Referring now to the accompanying drawings in detail, the mud throttling valve of the invention is designated generally by the reference numeral 10 and embodies in its construction a cylindrical housing 11 provided at its ends with screw-threaded, removable end caps 12 and 13. The cap 12, which is located at what may be called the inlet end of the housing, is formed integrally with a tubular extension 12', the latter projecting into the housing and defining an inlet 14 in communication with a mud inlet pipe 15 which leads to the valve directly from the well (not shown).

An abutment member 16 is disposed at a fixed position in the housing adjacent the cap 12, being held therein by a suitable coupling ring 17 which encompasses annular shoulders 18, 19 provided, respectively, on the member 16 and extension 12' of the cap 12.

The abutment member 16 is formed with a central port or passage 20 in register with the inlet 14 in the cap extension 12' and also in register with an axial passage 21 in a valve member 22 now to be described.

The valve member 22, cylindrical in shape, is formed from suitable resilient material such as rubber, neoprene, or the like, the outside diameter thereof conforming to the inside diameter of the housing 11 in which the member 22 is positioned with one of its ends against the abutment member 16. The other end of the member 22 abuts a piston 23 which is slidable in the housing 11 and has a central port 24 in register with the passage 21 of the member 22, as will be clearly apparent. The resiliency of the valve member 22 is such that when axial thrust is applied thereto by the piston 23, it is axially compressed and becomes radially inwardly expanded to reduce the cross-section of the passage 21, substantially as illustrated in FIGURE 2. When application of such axial thrust is discontinued, the member 22 inherently resumes its initial form and the passage 21 is fully open, as shown in FIGURE 1.

A partition 25 is secured, as by welding or the like, in the housing 11 in spaced relation from the piston 23 and from the outlet end cap 13 of the housing. The partition 25 is provided with an integral, central boss 25' which projects into what may be called a fluid outlet chamber 26, existing in the housing between the partition 25 and the outlet end cap 13, it being noted that the cap 13 is equipped with a mud outlet pipe 27 through which the mud is recirculated to the mud pit, sump or tank of the well (not shown), the pipe 27, of course, being in communication with the chamber 26.

A fluid transmitting tube 28 is secured in the port 24 of the piston 23 for sliding movement therewith, the tube 28 extending slidably through a bore 29 provided centrally in the partition 25 and through a counterbore 30 provided in the boss 25' of the partition, so that the outer end of the tube 28 projects into and communicates with the aforementioned outlet chamber 26. Suitable packing glands 31 and a packing nut 32 are provided in the counterbore 30 to prevent leakage of fluid around the tube 28.

A portion of the housing 11 between the piston 23 and the partition 25 defines a pressure chamber 33 which surrounds the tube 28 but is out of communication with the interior of the tube. The chamber 33 is adapted to receive, as through a hose or pipe 34, fluid under pressure from a suitable hydraulic source (not shown), which is entirely independent of the fluid (mud) passing through the throttling valve.

It will be apparent that when hydraulic fluid under pressure is admitted through the line 34 into the pressure chamber 33, it will react between the relatively stationary partition 25 and the slidable piston 23, thus causing the piston to exert axial thrust on the resilient valve member 22 for inward radial expansion of the latter to reduce the cross-section of the passage 21 as already described. Possible leakage of the hydraulic fluid in the chamber 33 past the tube 28 will be prevented by the packing means 31, 32, so that the hydraulic fluid does not become mixed in the chamber 26 with the fluid (mud) passing through the valve. At the same time, the sliding movement of the tube 28 through the partition 25, caused by sliding of the piston 23, is facilitated while maintaining communication between the interior of the tube 28 and the mud outlet chamber 26, as will be readily understood.

It is to be particularly noted that the abutment member 16 and the piston 23 are preferably bonded, as by vulcanizing, to the ends of the valve member 22. Since the abutment member 16 and the adjacent end portion of the member 22 bonded thereto are held in a fixed position by the means 12, 12' and 17, they are not subject to motion by pressure in the valve, either the hydraulic pressure in the chamber 33 or the pressure of flow from the well. Thus, all compression of the valve member 22 must arise as the result of hydraulic fluid pressure in the chamber 33 and the valve is essentially what may be called a "fail open valve."

In addition, it is contemplated that the valve member 22 initially be of a much greater length than necessary, so that the excess length will serve to provide "reserve" which may be used to replace that lost through erosion or abrasion. This will allow the valve to be utilized over a much greater period of time than would otherwise be possible if the valve member were initially of just the adequate length.

The combination of the aforementioned reserve length of the valve member 22 and the bonding of the elements 16 and 23 thereto creates an unusual configuration in choking of the passage 21 when hydraulic fluid is admitted into the chamber 33. Such choking takes place at two longitudinally spaced regions 21' of the passage 21, with an enlarged region 21" between the two chokes, substantially as illustrated in FIGURE 2. This produces an effect of a "stage" choke, with each of the chokes having less pressure drop across it.

It will be also observed that the throttling valve of the invention is arranged axially to permit a straight-through flow of mud from one end of the valve to the other, thus eliminating wear and abrasion encountered in conventional valves wherein the flow is diverted.

While in the foregoing there has been described and shown the preferred embodiment of the invention, various modifications may become apparent to those skilled in the art to which the invention relates. Accordingly, it is not desired to limit the invention to this disclosure and various modifications and equivalents may be resorted to, falling within the spirit and scope of the invention as claimed.

What is claimed as new is:

1. A hydraulic throttling valve, comprising in combination, a tubular housing having a fluid inlet end and a fluid outlet end, an abutment member fixed in the fluid inlet end portion of said housing and provided with a central port in communication with the fluid inlet, a tubular valve member of resilient material positioned in the housing with one end thereof against said abutment member, said valve member having a central fluid passage in register with said central port of said abutment member, a piston slidable in the housing and abutting the other end of said valve member, said piston having a central port in register with said fluid passage of the valve member, a partition secured in said housing in spaced relation between said piston and said outlet end of the housing, the portion of the housing between said partition and the housing outlet end defining a fluid outlet chamber discharging through the outlet end, a fluid transmitting tube secured centrally to said piston in register with the piston port, said tube extending slidably through said partition and having an outer end discharging into said fluid outlet chamber, a portion of said housing between said partition and said piston defining a pressure chamber surrounding said tube but out of communication with the interior of the latter, said resilient valve member being axially compressible by said piston and radially inwardly expansible whereby the cross-section of said passage may be reduced as a function of axial thrust applied to the valve member by the piston, and means for admitting fluid under pressure into said pressure chamber whereby to effect application of axial thrust by said piston to said valve member.

2. The device as defined in claim 1 wherein said partition is provided with a central bore having said tube slidable therein, together with packing means provided in the bore of said partition around said tube.

3. The device as defined in claim 1 together with an end cap provided on the inlet end of said housing and having said fluid inlet formed therein, and means connecting said abutment member to said end cap to retain the abutment member at a fixed position in said housing.

4. The device as defined in claim 3 wherein said connecting means include a tubular extension provided centrally on the inside of said end cap in register with said fluid inlet and with said port of said abutment member, and a coupling ring securing the abutment member to said cap extension.

References Cited

UNITED STATES PATENTS

| | | | |
|---|---|---|---|
| 1,108,128 | 8/1914 | Buffum | 138—45 |
| 2,319,498 | 5/1943 | Gerard | 138—45 X |
| 2,735,642 | 2/1956 | Norman | 251—5 |
| 2,917,269 | 12/1959 | Welker | 251—62 |

LAVERNE D. GEIGER, *Primary Examiner.*

B. E. KILE, *Assistant Examiner.*